United States Patent
Nunes

(10) Patent No.: US 7,452,037 B1
(45) Date of Patent: Nov. 18, 2008

(54) ALLOY WHEEL WITH MATING WHEEL COVER

(76) Inventor: Mitchell Nunes, 8820 Maislin Dr., Tampa, FL (US) 33637

(*) Notice: Subject to any disclaimer, the term of this patent is extended or adjusted under 35 U.S.C. 154(b) by 0 days.

(21) Appl. No.: 11/645,294

(22) Filed: Dec. 26, 2006

(51) Int. Cl.
B60B 7/08 (2006.01)
B60B 7/18 (2006.01)

(52) U.S. Cl. .............................. 301/37.31; 301/37.102; 301/37.41

(58) Field of Classification Search ............ 301/37.101, 301/37.102, 37.41, 37.42, 37.28, 37.11, 37.34, 301/37.31, 37.43
See application file for complete search history.

(56) References Cited

U.S. PATENT DOCUMENTS

| | | | | |
|---|---|---|---|---|
| 1,609,878 A | * | 12/1926 | Liddell | 301/10.1 |
| 2,973,226 A | * | 2/1961 | Ellies | 301/37.42 |
| 3,894,775 A | * | 7/1975 | Christoph et al. | 301/37.35 |
| 4,004,837 A | * | 1/1977 | Main | 301/37.42 |
| 4,012,078 A | * | 3/1977 | Meyers | 301/37.35 |
| 5,368,370 A | * | 11/1994 | Beam | 301/37.36 |
| 5,636,906 A | * | 6/1997 | Chase | 301/37.43 |
| 5,795,035 A | | 8/1998 | Fuller | |
| 5,829,843 A | * | 11/1998 | Eikhoff | 301/37.43 |
| 5,845,973 A | * | 12/1998 | Chase | 301/37.43 |
| 6,010,196 A | | 1/2000 | Wang et al. | |
| 6,068,346 A | * | 5/2000 | Pender | 301/40.6 |
| 6,068,350 A | * | 5/2000 | Baumgarten et al. | 301/64.102 |
| 6,247,760 B1 | | 6/2001 | Kinoshita | |
| D445,750 S | | 7/2001 | Nunes et al. | |
| 6,409,277 B2 | | 6/2002 | Nunes et al. | |
| 6,663,189 B2 | * | 12/2003 | Enomoto et al. | 301/37.36 |
| 6,672,678 B1 | | 1/2004 | Nunes | |

OTHER PUBLICATIONS

US 6,755,485, 06/2004, Chase (withdrawn)*

* cited by examiner

Primary Examiner—Russell D Stormer
Assistant Examiner—Kip T Kotter
(74) Attorney, Agent, or Firm—Albert O. Cota

(57) ABSTRACT

An alloy vehicle wheel (20) that includes a mating wheel cover (22), with the wheel consisting of a centrally located hub (24), a rim (26), and a number of integral spokes (28) attached to both the hub and rim. Slots (30) are incorporated into the spokes of the wheel and are configured to receive attachments. The molded wheel cover (22) is shaped to replicate the wheel and incorporates decorative design configurations (40) on its visual surfaces. Mushroom head studs (46) are integrally formed into the interior surface of the wheel cover and are positioned to penetrate the slots in the spokes as attachments for fastening the wheel cover to the alloy wheel.

14 Claims, 4 Drawing Sheets

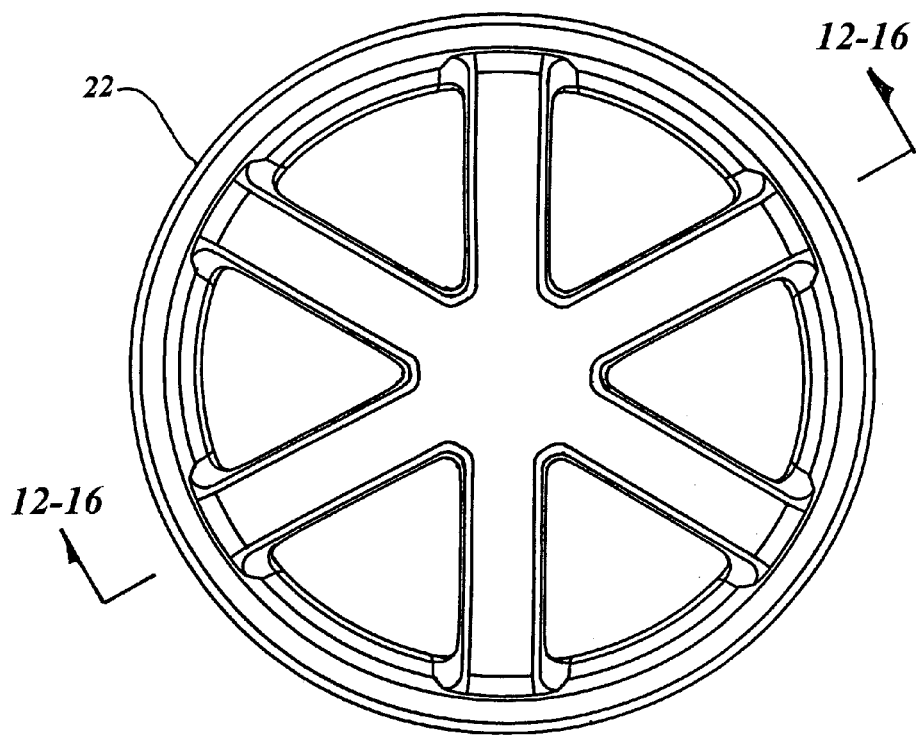
FIG. 11
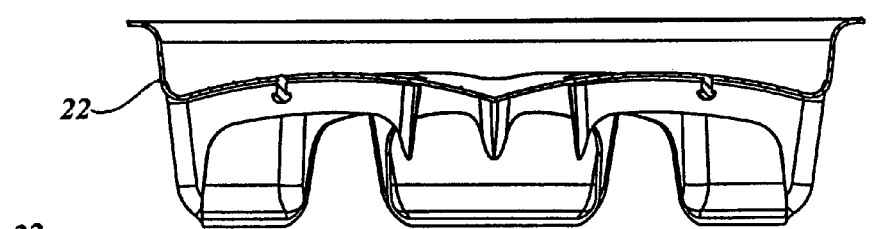
FIG. 12
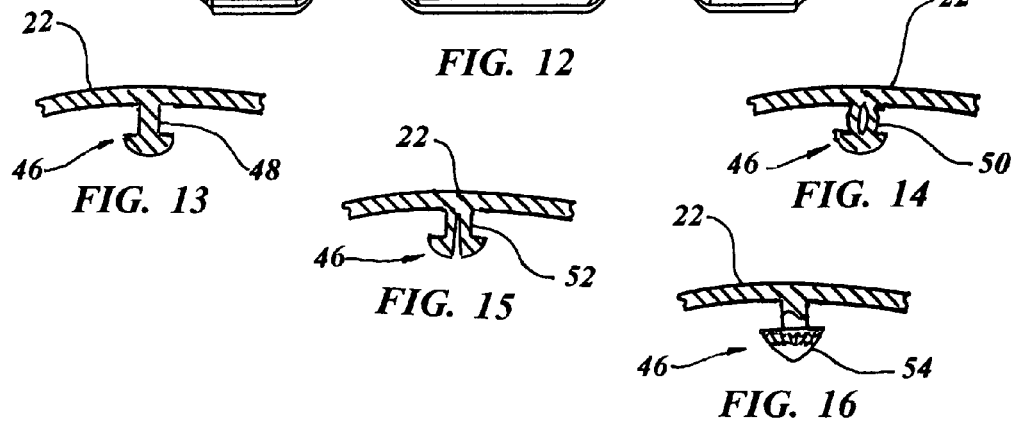
FIG. 13
FIG. 15
FIG. 14
FIG. 16

ALLOY WHEEL WITH MATING WHEEL COVER

TECHNICAL FIELD

The invention generally pertains to vehicle alloy wheels with mating wheel covers, and more specifically to a spoked alloy wheel configured to accept a mating wheel cover that is retained with studs penetrating the spokes of the wheel and that are locked into slots when the cover is rotated on the wheel.

BACKGROUND ART

Previously, many types of wheel covers have been used to provide an effective means to alter the design, style or finish of vehicle wheel to enhance its appearance.

The prior art listed below did not disclose patents that possess any of the novelty of the instant invention, however the following U.S. patents are considered related:

| U.S. Pat. No. | Inventor | Issue Date |
| --- | --- | --- |
| 5,636,906 | Chase | Jun. 10, 1997 |
| 5,795,035 | Fuller | Aug. 18, 1998 |
| 6,010,196 | Wang et al. | Jan. 4, 2000 |
| 6,247,760 | Kinoshita | Jun. 19, 2001 |
| 6,402,253 | Nunes et al. | Jun. 11, 2002 |
| 6,409,277 | Nunes et al. | Jun. 25, 2002 |
| 6,672,678 | Nunes | Jan. 6, 2004 |

Chase in U.S. Pat. No. 5,636,906 teaches a composite vehicle wheel having a disk, a rim circumscribing the disk, and an ornamental metal-plated plastic cover that is attached to the outer surface of the disk. The cover has a pair of oppositely disposed surfaces which form interior and exterior surfaces of the cover, with the exterior surfaces chrome plated.

U.S. Pat. No. 5,795,035 issued to Fuller is for a wheel cover that simulates a machined cast wheel and that is formed by stamping a blank from a sheet of metal. Windows are spaced about the cover and a marginal circular periphery is formed as a flange.

My U.S. Pat. Nos. 6,010,196 (Wang et al.) and 6,402,253 (Nunes et al.) disclose a simulated chrome plated vehicle wheel that covers a conventional wheel with a thin chrome plated wheel cover. The wheel cover is formed of a plastic substrate having a contour that includes identical contours and surface patterns of the wheel. The cover is attached to the wheel with fasteners and a wheel clip.

Kinoshita in U.S. Pat. No. 6,247,760 teaches a wheel cover having a body with a plurality of elastically deformable hooks projecting from the rear of the cover body. Each hook engages a spoke of the wheel, and each hook includes a plastic body and a metal piece which is connected to the plastic body. The metal pieces of two adjacent hooks are integrally connected to each other by a metal plate.

My U.S. Pat. Nos. 6,409,277 (Nunes et al.) and 6,672,678 (Nunes) disclose a vehicle wheel cover having a design replicating a conventional wheel while encompassing the lug nuts. The wheel cover includes a number of fasteners that clip onto the peripheral edge of the vehicle wheel, thereby simulating the appearance of a chrome plated wheel.

For background purposes and as indicative of the art to which the invention is related reference may be made to the remaining cited patent issued to Nunes et al. in design U.S. Pat. No. D445,750.

DISCLOSURE OF THE INVENTION

Alloy wheels are extremely popular, however this type of wheel is typically expensive to manufacture, therefore only a specific configuration is normally available due to the initial cost. The only practical differentiation offered is usually limited to the final finish and plating. Therefore, the primary object of the invention is to provide an improvement with sufficient novelty to permit a generic wheel to be manufactured which could be changed at any time to a different design with a unique outward appearance. This uniqueness is achieved by the use of a wheel cover that duplicates the shape of the original wheel on the interior and acts as a skin, while permitting the outer surface to be formed with a completely different design, thereby allowing personalization of each set of wheels. In the past with steel wheels, a thermoplastic wheel cover was simply snapped into place on the exterior of the rim, thereby covering the entire wheel with or without openings for the lug nuts. However, with alloy wheels, the spokes disallow such attachment as a recess within the outer surface of the rim is not practical and the spokes usually extend to the edge of the rim. It may be clearly seen that the invention addresses this need in a practical and economical manner.

An important object of the invention is that the wheel cover may be cast in a common mold for a given diameter wheel and machined with different offsets and bolt patterns to match existing vehicles. The wheel cover may be easily molded to fit the basic interior configuration of the wheel, regardless of its bolt pattern and offset, and yet permit a myriad of designs and configurations to be formed on the outer surface.

It may be easily understood that another object of the invention is realized by the reduction in overall manufacturing costs due to the wheel cover's simplicity and versatility relative to its universal adaptation to similar diameter wheels and mating cover orientation.

Still another object of the invention may be appreciated due to the fact that the wheel cover duplicates the configuration of the spokes and rim to the extent that it is almost undetectable, as the edge of the rim is substantially covered and the spokes are completely concealed on the top surface and each of the sides.

Yet another object of the invention permits not only multiple designs on the outer surface of the wheel cover but the central portion of the invention may either cover the hub completely or match the contour of the hub, thereby permitting the lug bolts to be exposed for ease of wheel removal.

An additional object of the invention is the ease in which the wheel cover may be replaced if damaged at a minimal cost. Since alloy spoked wheels are expensive this object may be appreciated by the owner of the vehicle in the event of an accident or mishap.

A final object of the invention is realized by the inherent design of both the wheel and the cover, thus making it easy to install and remove. The cover substantially duplicates the entire outer surface of the wheel, however the sides of the spokes have a slight minimal gap or offset. This gap is only the width of a slot or slots provided in each spoke. When the wheel cover is placed over the wheel, a mating mushroom head stud is aligned with one edge of the slot and is easily inserted onto an area of the slot slightly larger than the diameter of the stud. The wheel cover is then rotated clockwise until the stud snaps into place in a smaller area of the slot, thereby changing the gap from one side of the spoke to the other. This arrangement is easily accomplished and the centrifugal force of the wheel rotating during operation has no effect on the security of the attachment. Removal is simply a reverse procedure which is easily understood with simple directions. These and other objects and advantages of the present invention will become apparent from the subsequent detailed description of the preferred embodiment and the appended claims taken in conjunction with the accompanying drawings.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 11 is a front view of the molded wheel cover in the embodiment enclosing the hub area of the wheel.

FIG. 12 is a cross-sectional view taken along lines 12-12 of FIG. 7.

FIG. 13 is an enlarged partial cross-sectional view taken along lines 13-13 of FIG. 11 illustrating a mushroom head stud straight shank variation.

FIG. 14 is an enlarged partial cross-sectional view taken along lines 14-14 of FIG. 11 illustrating a mushroom head stud split shank variation.

FIG. 15 is an enlarged partial cross-sectional view taken along lines 15-15 of FIG. 11 illustrating a mushroom head stud grooved shank variation.

FIG. 16 is an enlarged partial cross-sectional view taken along lines 16-16 of FIG. 11 illustrating a fluted mushroom head straight shank stud variation.

BEST MODE FOR CARRYING OUT THE INVENTION

Figure 1:
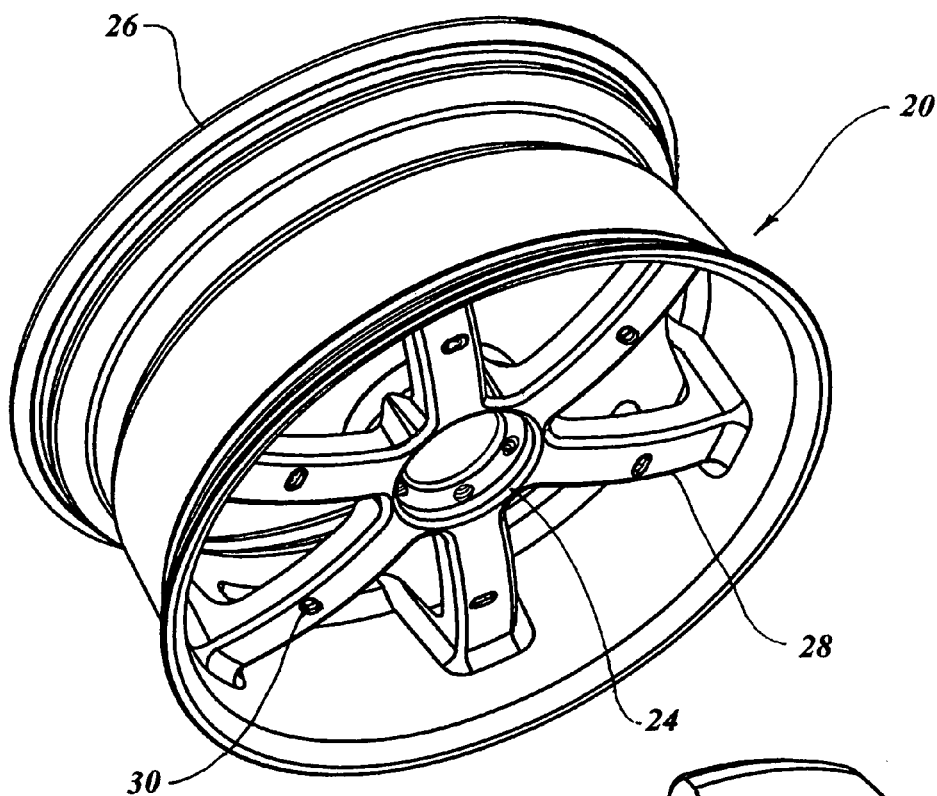
FIG. 1 is a partial isometric view of the vehicle alloy wheel in the preferred embodiment.
Figure 2:
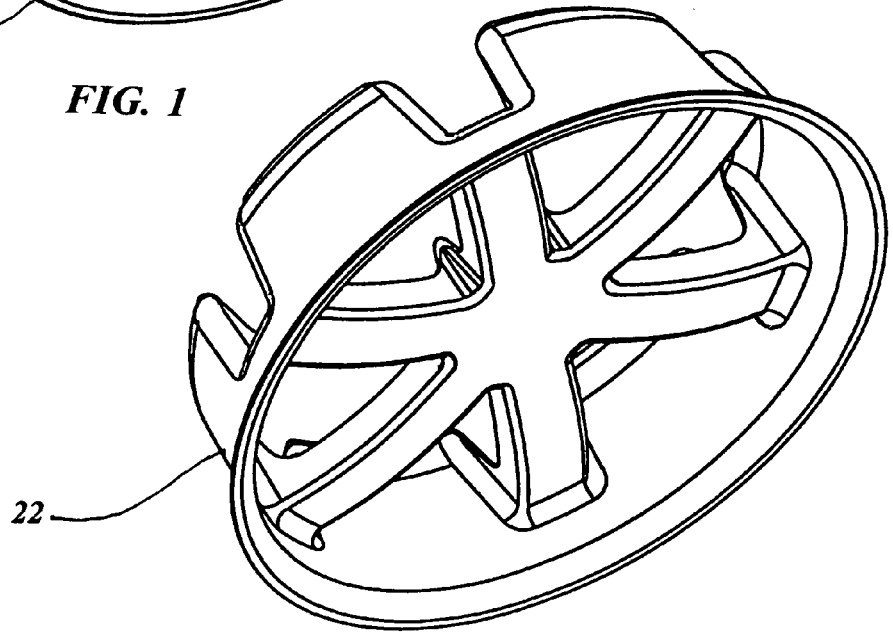
FIG. 2 is a partial isometric view of the molded wheel cover in the preferred embodiment.
Figure 3:
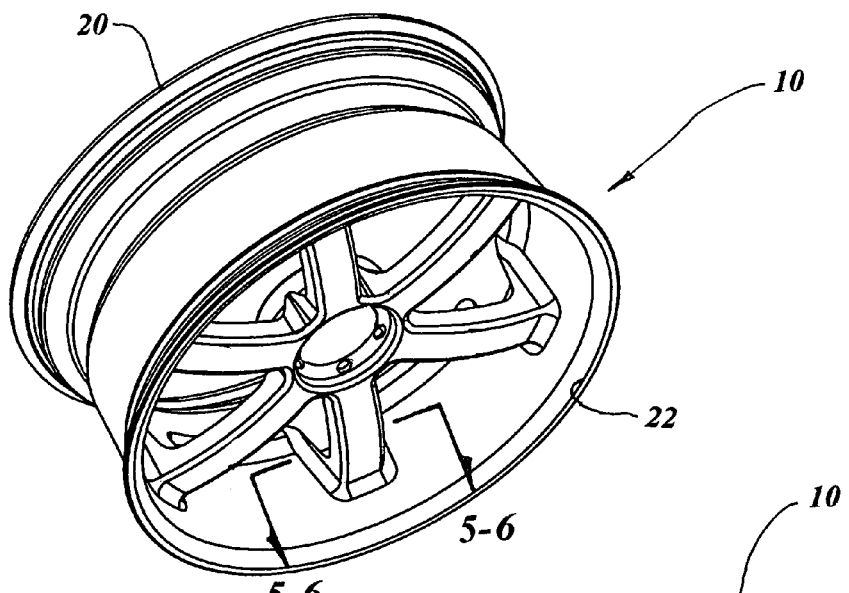
FIG. 3 is a partial isometric view of the wheel with the molded wheel cover having lug nut openings in the hub installed onto the wheel.

The best mode for carrying out the invention is presented in terms of a preferred embodiment for a vehicle wheel with mating wheel cover 10. The preferred embodiment of the combination of wheel and cover 10 is shown in FIGS. 1 through 16, and incorporates a specific alloy wheel 20 with its mating wheel cover 22

The alloy wheel 20 includes a centrally located hub 24, a rim 26, and a plurality of integral spokes 28 attached to the hub 24 on a first end, with the spokes 28 attached to the rim 26 on a second end. The rim 26 is configured to retain a conventional automotive tire. The wheel 20 is preferably formed of an alloy, which is well known in the art, and may be plated with chromium, machined, sandblasted or polished. The wheel 20 is illustrated individually in FIGS. 1 and 7-10, and is similar to those manufactured and marketed throughout the world except with the improvements described hereafter. It should be noted that while six spokes 28 are illustrated in the drawings, any number of spokes 28 may be used according to the desired aesthetic value, diameter of the wheel 20, or the type of vehicle on which they are applied.

Each integral spoke 28 incorporates at least one slot 30 completely through the spoke 28 extending from the spoke's outer surface. The slot 30 is configured with the purpose of receiving attachments for the wheel cover 22. While a single slot 30 per spoke 28 is illustrated in FIGS. 1, 7, 9 and 10, more than one may be incorporated according to the size of the wheel and the spoke configuration, with two slots 30 shown as an example in FIG. 8.

Figure 7:
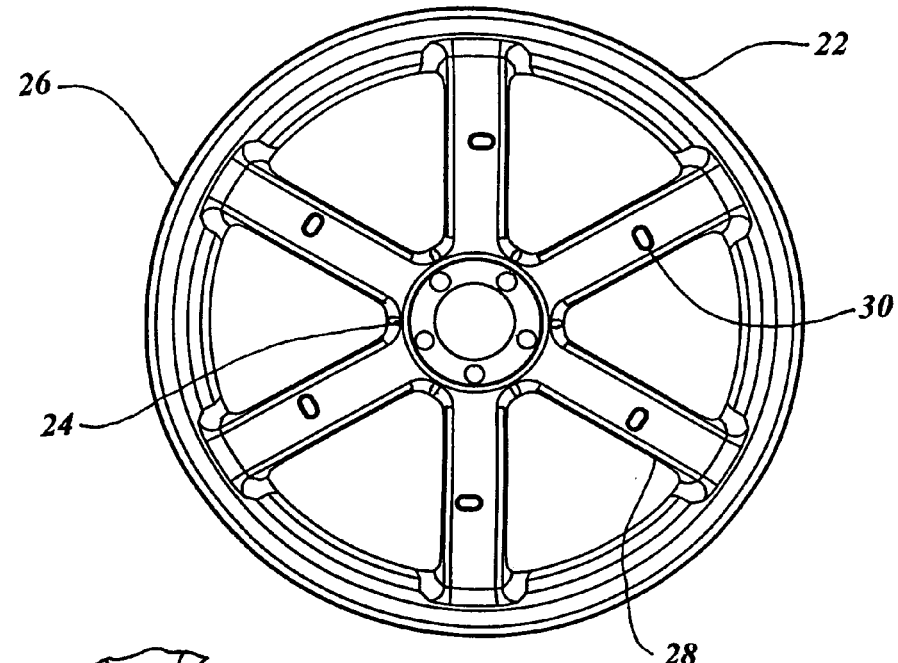
FIG. 7 is a front view of the vehicle alloy wheel in the preferred embodiment.
Figure 8:
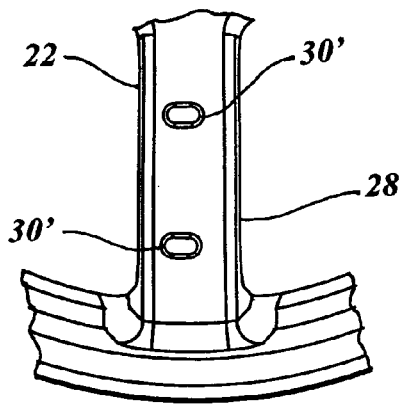
FIG. 8 is a fragmentary front view of one of the spokes of the vehicle alloy wheel illustrating defining two full slots.
Figure 9:
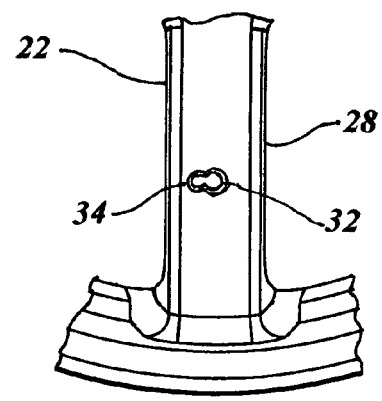
FIG. 9 is a fragmentary front view of one of the spokes of the vehicle alloy wheel illustrating the larger round opening overlapping a smaller round opening defining the slot.
Figure 10:
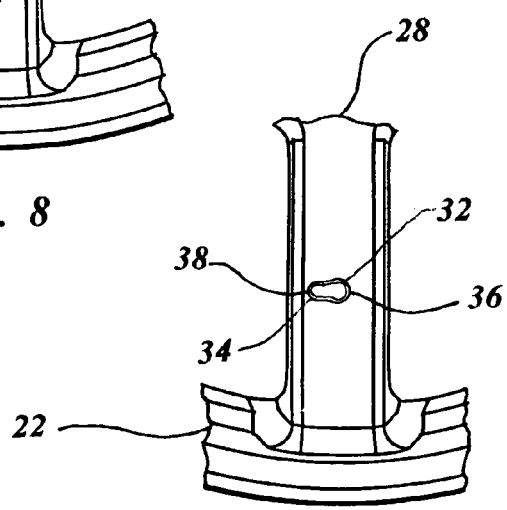
FIG. 10 is a fragmentary front view of one of the spokes of the vehicle alloy wheel illustrating the larger round opening tapering to a smaller round opening defining the slot.

There are many types of slots 30 that may be employed having equivalent utility. One type of slot 30 is defined as a full slot 30', which has the same width throughout and a length longer than the width, as shown in FIGS. 1, 7 and 8. Another equally viable slot configuration has a larger round opening 32 overlapping a smaller round opening 34, thereby forming the slot 30, as illustrated in FIG. 9. Another approach is shown in FIG. 10, wherein the at least one slot 30 further consists of a larger round opening 32 on a first end 36 tapering to a smaller round opening 34 on a second end 38. It may be understood that the slot 30 in all of its configurations described above may be either flat on the rear surface relative to the front of the spoke 28, or sloped upwardly from the first end 36 to the second end 38, thereby allowing attachments to fit snugly, as indicated in FIG. 10.

Figure 5:
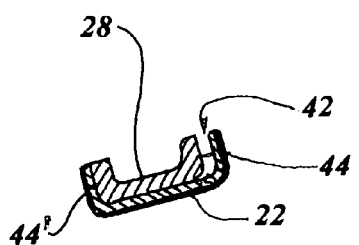
FIG. 5 is a cross-sectional view taken along lines 5-5 of FIG. 3 illustrating the gap between the spoke and the cover on a first side as during the initial assembly of the cover to the wheel.
Figure 6:
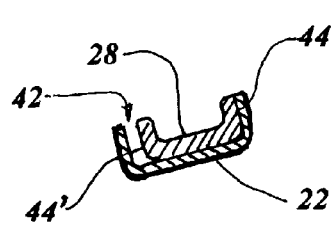
FIG. 6 is a cross-sectional view taken along lines 6-6 of FIG. 3 illustrating the final position of the cover to the spoke when the cover has been rotated to snap the studs in place.
Figure 4:
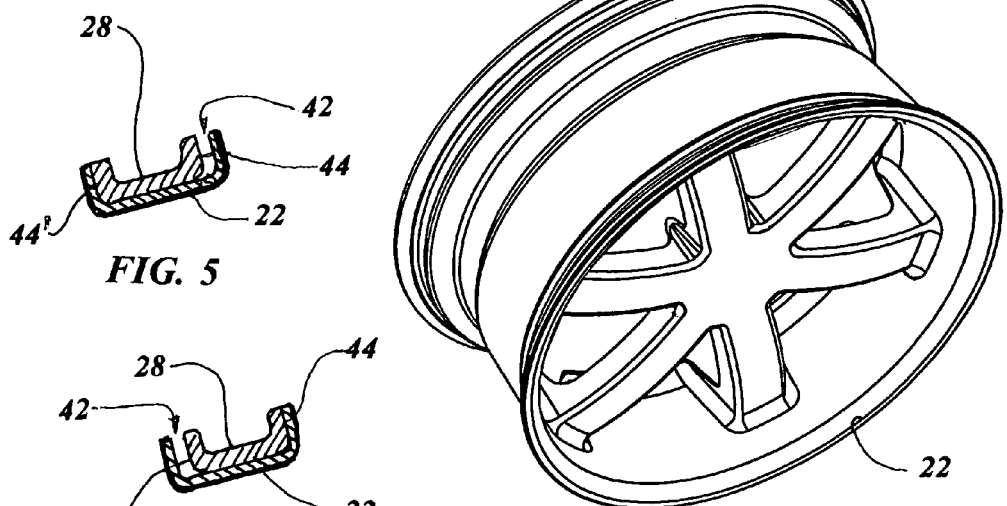
FIG. 4 is a partial isometric view of the molded wheel cover with the cover enclosing the entire wheel hub area installed on the wheel.

The molded wheel cover 22 embraces the alloy wheel 20, with the cover 22 shaped for replicating the wheel's outer surface, thereby permitting the cover 22 to intimately embrace the top surface of the hub 24, rim 26 and spokes 28. While the entire cover 22 fits identically upon the wheel 20 like a glove, one area is slightly larger as it contains a spoke offset width 42 or gap between the inside surface of the cover 22 to the sides of the spokes 28. This offset width 42 is provided to allow the cover 22 to engage either one or the other side of the spoke 28, which permits the wheel cover to be installed by initially engaging a first side 44 of each spoke and minutely rotating the cover the length of the slots 30 to engage the second side 44' of the spokes, thus providing sufficient room to allow attachments to engage opposed edges of the slots 30, as illustrated in FIGS. 5 and 6 as described subsequently.

The wheel cover 22 may be made of a material such as a poly carbonate formulation, poly vinyl chloride (PVC), cellulose, polyethylene, polystyrene or polypropylene, however acrylonitrile butadeine styrene (ABS) material is preferred. It is also preferable to have the wheel cover 22 plated with chromium after molding.

As previously stated the novelty of the invention is to permit a spoked wheel 20 to be installed on a vehicle and thereafter attach a wheel cover 22 that fits such that it is unnoticeable or undetectable as a separate cover. The benefit of this approach allows the owner to select a number of decorative design configurations 40 that may be formed into the top surface of the spokes 28 to allow the vehicle to achieve a personalized appearance. Heretofore there has not been any way to conveniently attach a wheel cover 22 to the spokes 28.

In order to provide the attachment of the wheel cover 22 to the wheel 20, a number of mushroom head studs 46 are integrally formed within the wheel cover 22. The mushroom head studs 46 are specifically positioned on the interior of the cover 22 directly above the spokes 28 and are situated to penetrate the slot 30 in each spoke 28, thus providing a secure and sturdy attachment of the wheel cover 22 to the alloy wheel 20.

FIGS. 12-16 depict a number of variations in the configuration of the mushroom head studs 46, all of which function in the same manner and are included in the invention. FIGS. 12 and 13 illustrate a mushroom head with a straight shank 48, a mushroom head with a split shank 50 is shown pictorially in FIG. 14, and the embodiment of FIG. 15 incorporates a mushroom head with a grooved shank 52. Another variation utilizes a fluted mushroom head with a straight shank 54 which permits the head itself to be temporarily deformed while being urged into the slot 30 and when fully engaged snaps into place on the obverse side of the slot 30.

It is anticipated that the use of the full slot 30' in conjunction with the fluted mushroom head with a straight shank 54 is ideal, or even a round hole may be used with equal ease and dispatch. It should also be understood that the mushroom head stud with a straight shank 48 may also be used with the full slot 30' as when sized properly the edge of the head may deform sufficiently to snap appropriately into the slot 30. It should be noted that all of the configurations of the shank of the stud 46 will function appropriately with all of the variations of the slot 30 described previously.

In functional operation the wheel cover 22 may be easily installed by aligning the spokes of the cover 22 with the wheel spokes 28 on the counter clockwise side, as illustrated in FIG. 5, while urging the cover 22 to intimately embrace the wheel 20, which allows the studs 46 to penetrate the slots 30. When the cover 22 touches the entire wheel 20 and the studs 46 are all aligned properly, the cover 22 is then rotated slightly in a clockwise direction, thereby permitting the studs 46 to snap into place, as illustrated in FIG. 6. The rotational movement may be accomplished by the sides of the wheel cover 22 in the area of the spokes 28 either pushing manually or striking gently with a soft mallet.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A vehicle wheel with mating wheel cover comprising:
a) an alloy wheel having a centrally located hub, a rim, and a plurality of integral spokes attached to the hub on a first end, with the spokes attached to the rim on a second end and with the rim configured to retain a tire thereupon,
b) each integral spoke having at least one slot through an outer surface of the spoke, with the at least one slot configured to receive attachments,
c) a molded wheel cover embracing the wheel with the cover shaped to replicate the alloy wheel, intimately embracing the top surface of the spokes,
d) a plurality of mushroom head studs integrally formed with the wheel cover with the mushroom head studs positioned to penetrate the at least one slot in each spoke for attaching the wheel cover to the alloy wheel, and
e) wherein said wheel cover having a spoke offset width for engaging the spoke sides permitting the wheel cover to be installed by contiguously engaging one side of each spoke and when minutely rotated the length of the slots allowing the studs to snap in and engage opposed edges of the at least one slot in each spoke.

2. The vehicle wheel with mating wheel cover as recited in claim 1 wherein said alloy wheel further having a plated chromium surface.

3. The vehicle wheel with mating wheel cover as recited in claim 1 wherein said at least one slot further comprises radial ends with a configuration defined as a full slot with a same width except for the radial ends and a length longer than the width.

4. The vehicle wheel with mating wheel cover as recited in claim 1 wherein said at least one slot further comprises a configuration defined as a larger round opening overlapping a smaller round opening.

5. The vehicle wheel with mating wheel cover as recited in claim 1 wherein said at least one slot further comprises a configuration defined as a larger round opening on a first end tapering to a smaller round opening on a second end.

6. The vehicle wheel with mating wheel cover as recited in claim 1 wherein said wheel cover further comprises an acrylonitrile butadeine styrene (ABS) material.

7. The vehicle wheel with mating wheel cover as recited in claim 1 wherein said wheel cover further comprises a material selected from the group consisting of a poly carbonate formulation, poly vinyl chloride (PVC), cellulose, polyethylene, polystyrene and polypropylene.

8. The vehicle wheel with mating wheel cover as recited in claim 1 wherein said wheel cover is plated with chromium.

9. The vehicle wheel with mating wheel cover as recited in claim 1 wherein said wheel cover further comprises a decorative design configuration at least on a top surface of the spokes.

10. The vehicle wheel with mating wheel cover as recited in claim 1 wherein said wheel cover has a configuration undetectable from the alloy wheel when attached thereon.

11. The vehicle wheel with mating wheel cover as recited in claim 1 wherein said mushroom head studs further comprise a mushroom head with a straight shank.

12. The vehicle wheel with mating wheel cover as recited in claim 1 wherein said wherein said mushroom head studs further comprise a mushroom head with a split shank.

13. The vehicle wheel with mating wheel cover as recited in claim 1 wherein said wherein said mushroom head studs further comprise a mushroom head with a grooved shank.

14. The vehicle wheel with mating wheel cover as recited in claim 1 wherein said wherein said mushroom head studs further comprise a fluted mushroom head with a straight shank.

* * * * *